Patented Apr. 12, 1938

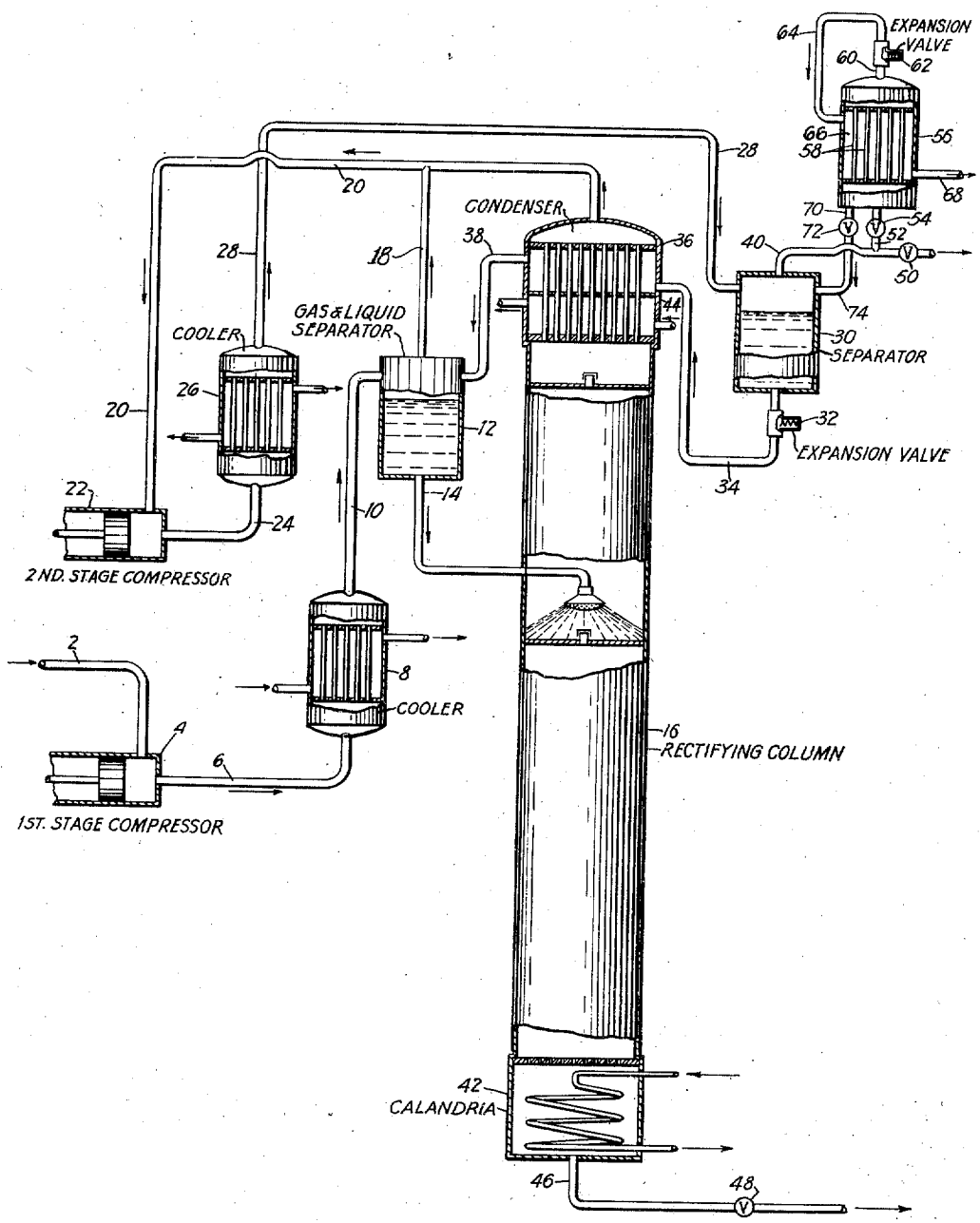

2,113,588

UNITED STATES PATENT OFFICE 2,113,588

SEPARATING GASOLINE FROM GASES

Crawford H. Greenewalt, Wilmington, Del., assignor to E. I. du Pont de Nemours & Company, Wilmington, Del., a corporation of Delaware Application July 5, 1935, Serial No. 30,031

13 Claims. (Cl. 196—11)

This invention relates to a process and apparatus for the separation of mixtures of gaseous hydrocarbons by liquefaction and fractionation, and more particularly to the recovery of hydrocarbons containing in excess of three carbon atoms per molecule from a complex gas mixture.

The pyrolysis of petroleum materials, as practiced in commercial vapor phase cracking operations, produces both liquid and gaseous products. These cracked gases are usually saturated with materials boiling in the gasoline range which must be recovered prior to use of the gas in other processes or for fuel.

In the gasoline refining industry this recovery of gasoline is often effected by compressing the cracking gas to a moderate pressure, cooling, and thereby liquefying a portion of its gasoline content. The uncondensed gases, still under pressure, are then forced up through a scrubbing tower, countercurrent to a light oil which scrubs the remaining gasoline from the fixed gases. The low-boiling gasoline is then distilled from the "fat" oil, which is then recycled to the scrubbing operation. The distillate is joined with the liquid fraction separated after compression, and the mixture is introduced into a stabilizing column where the low-boiling components which are too volatile to be used in gasoline are distilled off. I have found it much more expedient to recover and to stabilize the gasoline content of the cracked gas in a different manner.

One object of this invention is to provide a simple and efficient process whereby the components of a complex mixture of gaseous hydrocarbons which are usually a stable liquid at ordinary conditions of temperature and pressure are recovered from the gas mixture. Another object is to provide a method for the recovery of a relatively non-volatile liquid product such as gasoline, free from such constituents as hydrogen, methane, ethane, ethylene, and propylene from a mixture of hydrocarbon gases produced by cracking petroleum products, which is especially applicable for use in conjunction with processes for separating the less easily liquefied gases into their component parts. A further object is the accomplishment of the above ends with a minimum of equipment and of operating steps. A still further object is the providing of an apparatus for the accomplishment of the above ends. Other objects will appear hereinafter.

These objects are accomplished by the following invention which comprises compressing the gas mixture, cooling and separating the liquid formed, compressing the uncondensed separated gas to a higher pressure, cooling, thus effecting further liquefaction, separating the liquid resulting from the second compression, reducing its pressure to that of the first liquid, introducing the liquids into a rectifying column in which the more volatile gases are separated from the materials boiling in the gasoline range by fractional distillation, and passing the gases emerging from the rectifying column through the second compression and cooling operation.

The accompanying drawing represents diagrammatically a complete apparatus for the separation of the components of this fluid mixture. Reference will be made to this drawing in order to properly describe the invention. The following represents a preferred embodiment of the process and apparatus. It is to be understood that the details of this apparatus, which are well known to those skilled in the art, have been omitted for the sake of clarity and that modifications in the details of construction and in arrangement of parts may be made without departing from the spirit of my invention.

The mixture of crude hydrocarbon gases which may contain hydrogen, methane, ethylene, ethane, propylene, propane, butylene, butane, pentane, and hydrocarbons boiling in the gasoline range, or such aromatic compounds as benzene, toluene, and xylene, is drawn through pipe 2 from a suitable source of supply such as a vapor phase cracking operation to compressor 4 where the pressure is raised to about 6.0 atmospheres. Compressor 4 discharges the gas through pipe 6 to a water-cooled cooler 8 in which the higher boiling material is condensed. The mixture of condensate and gas is led through pipe 10 to separator 12 from which the separated liquid is introduced by means of pipe 14 into a stabilizing or rectifying column 16. The gas from separator 12, emerging through pipe 18, joins gas streams from other parts of the system and is led through pipe 20 to compressor 22 where the pressure is raised from about 6.0 to about 35 atmospheres. Further condensation takes place in water cooler 26 to which the compressed gas is led through pipe 24. The mixture of liquid and gas formed in water cooler 26 is conveyed by pipe 28 to separator 30. The condensate separated in 30 is passed through a throttling valve 32 and is chilled by the sudden expansion from about 35 atmospheres to about 6.0 atmospheres. Advantage is taken of this chilling by using the condensate to condense a part of the reflux at the top of the rectifying column 16. The condensate, now a mixture of liquid and gas, after expansion in valve 32, flows through pipe 34 to section 36 of the column condenser and passes through pipe 38 into separator 12 in which the liquid portion is separated and sent to join the feed to the stabilizing column while the gas joins the main stream.

The feed to the rectifying column 16 contains a considerable amount of such low-boiling hydrocarbons as ethylene, ethane, propylene, propane, butylene, and butane. It is a function of this rectifying column to separate and return the desired proportion of these low-boiling hydrocarbons to the main gas stream via pipe 20. For this purpose the liquid in calandria 42 is boiled with steam and reflux is supplied from the two condensers 36 and 44, the former cooled by expanded condensate, as described above, and the latter cooled with water. The liquid bottoms from calandria 42 are discharged from the system through pipe 46 and valve 48.

The portion of the low-boiling hydrocarbons separated in the rectifying column 16 is drawn off by pipe 20 and passed to compressor 22, where the pressure is raised from about 6.0 to about 35 atmospheres. The gases are then cooled and the liquid separated from them in the gas and liquid separator 30, as explained above. The gaseous fraction recovered from the gas and liquid separator may be passed directly out of the system by way of pipe 40 and valve 50 to be used at 35 atmospheres pressure in another process, for example, one for the separation of the various components of the gas; or this gas may be further stripped of its higher boiling fraction, reduced to atmospheric pressure and used, for example, as fuel. This latter process may be accomplished by passing the gas in pipe 40 through pipe 52 and valve 54 into the backward return condenser 56. Here the gases are passed upward through a series of tubes 58 and out of the top by way of pipe 60. The pressure on the gases is then released by means of expansion valve 62 and the cooled gases returned to the condenser by way of pipe 64. Here they pass through section 66 in heat exchange relationship with the gases in the tubes 58, thus serving to cool the gases in the tubes and condense the higher boiling liquids. The gases in section 66 of condenser 56 pass out of the system by way of pipe 68 and may be used as a fuel. The liquid fraction separated in the backward return condenser is returned to the gas and liquid separator 30 by way of pipe 70, valve 72, and pipe 74.

The operating conditions outlined in the above description will suffice to illustrate the principle of my invention, but it will be realized that good results can be achieved even though deviations from the above procedure are made. For example, while it is preferred to initially compress the raw gas to 6 to 9 atmospheres, a higher pressure may be employed if it is convenient from a standpoint of the processes which may follow. A somewhat lower pressure may be used, but this results in more of the gasoline vapor being carried over to the second compressor. Two compressors have been indicated in the diagram, but of course these may be replaced with a single multi-stage compressor.

It has been pointed out that my invention is particularly well adapted for operation in conjunction with liquefaction units for the separation of cracking gases. The pressure to which the gases are compressed in the second stage depends largely on the pressure under which the liquefaction operation is conducted. Usually this is in excess of 22 atmospheres, but most of the gasoline can be recovered at somewhat lower pressures.

In the foregoing, gasoline has been mentioned as the relatively high-boiling fraction which is recovered from cracked petroleum gases. My invention is equally satisfactory for removing such aromatic hydrocarbons as benzene, toluene, and xylene from the gases.

In refinery practice, it is usual to recover gasoline from cracking gases by the low-pressure, oil-scrubbing procedure previously outlined rather than to compress high enough to effect complete separation. When, however, the gas mixture is to be further separated into its constituents by liquefaction and fractionation operations, my process offers important advantages. Liquefaction processes necessarily involve compression to a pressure which will permit complete gasoline recovery. Use, therefore, can be made of liquefaction compression equipment. My process, which effects the recovery and stabilization of gasoline with equipment which consists principally of a single rectification column, is much to be preferred over the absorption method which involves the use of separate towers for scrubbing, distilling gasoline from the "fat" scrubbing oil, and for stabilizing the gasoline fraction.

As many apparently widely different embodiments of this invention may be made without departing from the spirit and scope thereof, it is to be understood that I do not limit myself to the specific embodiments thereof except as defined in the appended patent claims.

I claim:

1. A process of separating the gasoline fraction from cracked gaseous petroleum products containing gases that are lower boiling than said gasoline fraction, which comprises compressing the gases to be treated, cooling the compressed gases to effect substantial liquefaction of said gasoline fraction and separating said gasoline fraction therefrom, further compressing to a higher pressure the gases separated from the liquefied gasoline fraction and cooling the resulting compressed gases to effect further liquefaction of any remaining gasoline fraction and separating said gasoline fraction at this higher pressure, reducing the pressure on said latter gasoline fraction, rectifying the separated gasoline fractions at the lower pressure by countercurrent flow of reflux liquors and by boiling the liquid at the base of the rectifying column in order to establish refluxing conditions and expel the lower boiling hydrocarbons from the liquid gasoline, and combining the gaseous fraction from the rectifying column with the gaseous fraction from the first separator to be compressed to the higher pressure.

2. A process of separating the gasoline fraction from cracked gaseous petroleum products containing gases that are lower boiling than said gasoline fraction, which comprises compressing the cracked gases to about 6 to 9 atmospheres, cooling the compressed gases so as to liquefy some of the gasoline fraction and separating said liquefied gasoline fraction therefrom, further compressing the uncondensed gases thus separated to a pressure in excess of 22 atmospheres, cooling these gases to effect further liquefaction and separating this liquefied gasoline fraction, recovering the gases free of the gasoline fraction and releasing the pressure on the liquid gasoline fraction to the pressure of the first mentioned gasoline fraction, combining the resulting fluid with the first mentioned gasoline fraction and compressing any vapor resulting therefrom to above 22 atmospheres and returning it to the higher pressure stage prior to the cooling step, rectifying the combined liquid fractions at a pressure of about 6 to 9 atmospheres by countercurrent flow of reflux liquors and by boiling the liquid at the base of the rectifying column in order to establish refluxing conditions and expel the lower boiling hydrocarbons from the liquid gasoline, recovering the liquid gasoline from the base of the rectifying column and compressing the lower boiling hydrocarbons separated at the top of the rectifying column to a pressure above 22 atmospheres and returning these gases to the higher pressure cycle, and utilizing the cold liquid fraction resulting from the reduction of pressure to 6 to 9 atmospheres on the separated gasoline fraction obtained from the high pressure separation to partially condense and furnish the reflux liquors in the rectifying column.

3. A process of separating the gasoline fraction from cracked gaseous petroleum products containing gases that are lower boiling than said gasoline fraction, which comprises compressing the cracked gases to about 6 to 9 atmospheres, cooling the compressed gases so as to liquefy some of the gasoline fraction and separating said gasoline fraction therefrom, further compressing the uncondensed gases thus separated to a pressure in excess of 22 atmospheres, cooling these gases to effect further liquefaction and separating this liquefied gasoline fraction, further cooling the gaseous fraction thus separated by releasing the pressure thereon and by passing the cold low pressure gases in heat exchange relationship with the high pressure gases, thus effecting substantially complete condensation of the gasoline fraction, recovering the gases free of the gasoline fraction, combining the gasoline fractions obtained from the two high pressure separations and reducing the pressure on same to 6 to 9 atmospheres, combining the resulting fluid with the first-mentioned gasoline fraction and compressing any vapor resulting therefrom to above 22 atmospheres, and thus returning it to the higher pressure stage prior to the cooling step, rectifying the combined liquid fractions at a pressure of about 6 to 9 atmospheres by countercurrent flow of reflux liquors and by boiling the liquid at the base of the rectifying column in order to establish refluxing conditions and expel the lower boiling hydrocarbons from the gasoline fraction, recovering the liquid gasoline from the base of the rectifying column and compressing the lower boiling hydrocarbons separated at the top of the rectifying column to a pressure above 22 atmospheres, and thus returning these gases to the higher pressure stage prior to the cooling step, and utilizing the cold liquid fraction resulting from the reduction of pressure to 6 to 9 atmospheres on the separated gasoline fraction obtained from the high pressure separation to partially condense and furnish the reflux liquors in the rectifying column.

4. An apparatus for separating the components of a fluid mixture, which comprises the following elements in combination: a two-stage compressor, two gas and liquid separators, two coolers, and a still comprising a calandria, a rectifying column and a condenser with two sections, a conduit for conducting the fluids to be treated in the system to the low pressure stage of the two-stage compressor, a second conduit for conducting the compressed gases from the low pressure stage of the two-stage compressor through the first cooler and into the first gas and liquid separator, a third conduit for conducting the liquid from the said separator into the rectifying column, a fourth conduit for conducting the liquid bottoms from the rectifying column, a branching conduit for conducting the gaseous fraction from the top of the rectifying column and the gaseous fraction from the first gas and liquid separator to the high pressure stage of the two-stage compressor, a fifth conduit for conducting the gases from the high pressure stage of the two-stage compressor through the second cooler and into the second gas and liquid separator, a sixth conduit for conducting the gases from the second gas and liquid separator, a seventh conduit with an expansion valve therein for conducting the liquid from the second gas and liquid separator, lowering the pressure on the same, and passing the said liquid into one section of the condenser of the still so as to effect cooling therein, and an eighth conduit for conducting said fraction from said section of the condenser of the still into the first gas and liquid separator.

5. An apparatus for separating the components of a fluid mixture, which comprises the following elements in combination: a two-stage compressor, two gas and liquid separators, two coolers, a backward return condenser, and a still comprising a calandria, a rectifying column and a condenser with two sections, a conduit for conducting the fluids to be treated in the system to the low pressure stage of the two-stage compressor, a second conduit for conducting the compressed gases from the low pressure stage of the two-stage compressor through the first cooler and into the first gas and liquid separator, a third conduit for conducting the liquid from the said separator into the rectifying column, a fourth conduit for conducting the liquid bottoms from the rectifying column, a branching conduit for conducting the gaseous fraction from the top of the rectifying column and the gaseous fraction from the first gas and liquid separator to the high pressure stage of the two-stage compressor, a fifth conduit for conducting the gases from the high pressure stage of the two-stage compressor through the second cooler and into the second gas and liquid separator, a sixth conduit for conducting the gases from the second gas and liquid separator to the bottom of the backward return condenser so that the gases will pass up the condenser tubes, a seventh conduit with an expansion valve therein for conducting the gases from the top of the backward return condenser, releasing the pressure thereon and passing the cold gases into the cooling section of said condenser, an eighth conduit for conducting the gases from the cooling section of the backward return condenser, a ninth conduit for conducting the condensed liquid from the bottom of the backward return condenser to the second gas and liquid separator, a tenth conduit with an expansion valve therein for conducting the liquid from the gas and liquid separator, lowering the pressure on same and passing the said liquid into one section of the condenser of the still so as to effect cooling therein, and an eleventh conduit for conducting said fraction from said section of the condenser of the still into the first gas and liquid separator.

6. An apparatus for separating the components of a fluid mixture which comprises the following elements in combination: a two-stage compressor, two gas and liquid separators, two coolers and a backward return condenser, a conduit for conducting the fluids to be treated in the system to the low pressure stage of the two-stage compressor, a second conduit for conducting the compressed gases from the low pressure stage of the two-stage compressor through the first cooler and into the first gas and liquid separator, a third conduit for conducting the gases from the first gas and liquid separator to the high pressure stage of the two-stage compressor, a fourth conduit for conducting the gases from the high pressure stage of the two-stage compressor through the second cooler to the second gas and liquid separator, a fifth conduit for conducting the gases from the second gas and liquid separator to the bottom of the backward return condenser so that the gases will pass up the condenser tubes, a sixth conduit with an expansion valve therein for conducting the gases from the top of the backward return condenser, releasing the pressure thereon, and passing the cold gases into the cooling section of said condenser, a seventh conduit for conducting the gases from the cooling section of said condenser, an eighth conduit for conducting the condensed liquid from the bottom of the backward return condenser to the second gas and liquid separator, and a ninth conduit with an expansion valve therein for conducting the liquid from the second gas and liquid separator, releasing the pressure thereon to that of the liquid in the first gas and liquid separator, and conducting said fluid to said first gas and liquid separator.

7. In an apparatus for the recovery of the gasoline fraction from cracked gaseous petroleum products, which comprises in combination a rectifying column, means for compressing gases to be treated, means for effecting substantial condensation and separation of the gasoline fraction in these gases, means for introducing this condensate into the rectifying column, means for compressing the gases free of the condensed gasoline fraction to a higher compression stage, means for effecting further condensation of the gasoline fraction from these higher compressed gases, means for separating and recovering the gases free of the gasoline fraction, the improvement which comprises means for conducting the gaseous fraction from the rectifying column and combining same with the gases free of the condensed gasoline fraction prior to introduction into the high compression stage.

8. An apparatus for the recovery of the gasoline fraction from cracked gaseous petroleum products, which comprises in combination a rectifying column, means for compressing gases to be treated, means for effecting substantial condensation and separation of the gasoline fraction in these gases, means for introducing this condensate into the rectifying column, means for further compressing the gases thus separated from said gasoline fraction to a higher pressure, means for effecting further condensation of the gasoline fraction from these higher compressed gases, means for separating and recovering the gases completely free of the gasoline fraction, means for introducing the gasoline fraction from the second separation to the rectifying column, means for recovering the gasoline fraction from the rectifying column and means for recovering the fractionated gases from the rectifying column and introducing them into the second compression means.

9. An apparatus for the recovery of the gasoline fraction from cracked gaseous petroleum products, which comprises in combination a rectifier, means for compressing gases to be treated, means for effecting condensation of the gasoline fraction of the gases, means for separating the condensate from the gases, means for introducing the condensate into the rectifier, means for further compressing the gases separated from the gasoline fraction, means for effecting complete condensation of the gasoline fraction from the higher compressed gases, means for separating and recovering the gas from the second gasoline condensate, means for introducing this second condensate into the rectifying column, means for recovering the gasoline fraction from the rectifying column and means for introducing the rectified gases from the rectifying column into the gases from the first separator means prior to compression.

10. An apparatus for the recovery of the gasoline fraction from cracked gaseous petroleum products, which comprises in combination a rectifying column, a low pressure system in which the rectifying column operates and a high pressure system, means for compressing the gases and introducing the same into the low pressure system, means for cooling and condensing some of the gasoline contained in said gases, means for passing the gasoline thus condensed into the rectifying column, means for introducing the gases thus separated into the high pressure system, means for cooling and further condensing all of the gasoline from said compressed gases in said high pressure system, means for recovering the gaseous fraction thus separated, means for introducing the liquid fraction thus condensed into the low pressure system and from thence into the rectifying column, means for introducing the gases separated from the rectifying column into the high pressure system, means for recovering the liquids separated in the fractionating column.

11. In a process for separating the gasoline fraction from the lower boiling hydrocarbons in cracked gaseous petroleum products which comprises compressing gases to be treated, effecting substantial separation of the gasoline fraction from the compressed gases, fractionating the separated gasoline fraction so as to recover liquid gasoline freed from lower boiling hydrocarbons and separating these lower boiling hydrocarbons as a gaseous fraction, further compressing the gaseous fraction separated from said gasoline fraction in said first separation step to a higher pressure and effecting the further separation of the gasoline fraction from these gases at the higher pressure, the improvement which comprises combining the gaseous fraction separated in the fractionation step with the gases separated in the first separation step.

12. In a process for separating the gasoline fraction from the lower boiling hydrocarbons in cracked gaseous petroleum products which comprises compressing gases to be treated, effecting substantial separation of the gasoline fraction from the compressed gases, fractionating the separated gasoline fraction so as to recover liquid gasoline freed from lower boiling hydrocarbons and separating these lower boiling hydrocarbons as a gaseous fraction, further compressing the gaseous fraction separated from said gasoline fraction in said first separation step to a higher pressure and effecting the further separation of the gasoline fraction from these gases at the higher pressure, the improvement which comprises combining the gaseous fraction separated in the fractionation step with the gases separated in the first separation step, reducing the pressure on the gasoline fraction last separated to that of the rectifying system, and introducing said fraction into the rectifying step.

13. An apparatus for separating the components of a fluid mixture which comprises the following elements in combination: a multi-stage compressor, a cooler and a gas and liquid separator for each compression stage; a still comprising a calandria, a rectifying column, and a condenser with two sections; conduits for conducting the fluids to be treated in the system to a low pressure stage of the multi-stage compressor, a conduit for conducting the compressed gases from that low pressure stage of the multi-stage compressor through the cooler and into the gas and liquid separator connected therewith, another conduit for conducting the liquid from said separator into the rectifying column, a conduit for conducting the liquid bottoms from the rectifying column, a branching conduit for conducting the gaseous fraction from the top of the rectifying column and the gaseous fraction from the said gas and liquid separator into a higher stage of the multi-stage compressor, another conduit for conducting the gases from the higher stage of the multi-stage compressor through the cooler and into the gas and liquid separator connected therewith, a conduit for conducting the gases from the second mentioned gas and liquid separator, a conduit with an expansion valve therein for conducting the liquid from the second mentioned gas and liquid separator, lowering the pressure therein and passing the said liquid into one section of the condenser of the still so as to effect cooling therein, and another conduit for conducting the resulting fluid from said last mentioned section of the condenser of the still into the first mentioned gas and liquid separator.

CRAWFORD H. GREENEWALT.

CERTIFICATE OR CORRECTION.

Patent No. 2,113,588. April 12, 1938.

CRAWFORD H. GREENEWALT.

It is hereby certified that error appears in the printed specification of the above numbered patent requiring correction as follows: Page 3, first column, line 17, claim 2, for the word "cycle" read stage prior to the cooling step; lines 47 and 59, claim 3, strike out the word "thus"; and that the said Letters Patent should be read with this correction therein that the same may conform to the record of the case in the Patent office.

Signed and sealed this 5th day of July, A.D. 1938.

(Seal)

Henry Van Arsdale,
Acting Commissioner of Patents.

prises combining the gaseous fraction separated in the fractionation step with the gases separated in the first separation step, reducing the pressure on the gasoline fraction last separated to that of the rectifying system, and introducing said fraction into the rectifying step.

13. An apparatus for separating the components of a fluid mixture which comprises the following elements in combination: a multi-stage compressor, a cooler and a gas and liquid separator for each compression stage; a still comprising a calandria, a rectifying column, and a condenser with two sections; conduits for conducting the fluids to be treated in the system to a low pressure stage of the multi-stage compressor, a conduit for conducting the compressed gases from that low pressure stage of the multi-stage compressor through the cooler and into the gas and liquid separator connected therewith, another conduit for conducting the liquid from said separator into the rectifying column, a conduit for conducting the liquid bottoms from the rectifying column, a branching conduit for conducting the gaseous fraction from the top of the rectifying column and the gaseous fraction from the said gas and liquid separator into a higher stage of the multi-stage compressor, another conduit for conducting the gases from the higher stage of the multi-stage compressor through the cooler and into the gas and liquid separator connected therewith, a conduit for conducting the gases from the second mentioned gas and liquid separator, a conduit with an expansion valve therein for conducting the liquid from the second mentioned gas and liquid separator, lowering the pressure therein and passing the said liquid into one section of the condenser of the still so as to effect cooling therein, and another conduit for conducting the resulting fluid from said last mentioned section of the condenser of the still into the first mentioned gas and liquid separator.

CRAWFORD H. GREENEWALT.

CERTIFICATE OF CORRECTION.

Patent No. 2,113,588.     April 12, 1938.

CRAWFORD H. GREENEWALT.

It is hereby certified that error appears in the printed specification of the above numbered patent requiring correction as follows: Page 3, first column, line 17, claim 2, for the word "cycle" read stage prior to the cooling step; lines 47 and 59, claim 3, strike out the word "thus"; and that the said Letters Patent should be read with this correction therein that the same may conform to the record of the case in the Patent office.

Signed and sealed this 5th day of July, A.D. 1938.

(Seal)
                              Henry Van Arsdale,
                        Acting Commissioner of Patents.

CERTIFICATE OR CORRECTION.

Patent No. 2,113,588. April 12, 1938.
CRAWFORD H. GREENEWALT.

It is hereby certified that error appears in the printed specification of the above numbered patent requiring correction as follows: Page 3, first column, line 17, claim 2, for the word "cycle" read stage prior to the cooling step; lines 47 and 59, claim 3, strike out the word "thus"; and that the said Letters Patent should be read with this correction therein that the same may conform to the record of the case in the Patent office.

Signed and sealed this 5th day of July, A.D. 1938.

(Seal)

Henry Van Arsdale,
Acting Commissioner of Patents.